United States Patent
Westberg et al.

[15] 3,699,878
[45] Oct. 24, 1972

[54] WASHING MEANS FOR A SANDWICH SPREADING MACHINE

[72] Inventors: Bengt Karl-Axel Westberg, Nynashamn; Tor Axel Odman; Rune Fahlstrom, both of Stockholm, all of Sweden

[73] Assignee: Fahlstrom AB, Stockholm, Sweden

[22] Filed: Sept. 28, 1970

[21] Appl. No.: 76,103

[52] U.S. Cl. .................99/450.4, 425/86, 425/227
[51] Int. Cl. .......................................B08b 3/00
[58] Field of Search....107/1 R, 1 F; 134/56, 57, 172, 134/175, 198, 199, 200; 99/450.4

[56] References Cited

UNITED STATES PATENTS

| | | |
|---|---|---|
| 1,114,138 | 10/1914 | Hitchner...................107/1 F |
| 2,030,092 | 2/1936 | Benson................134/177 UX |
| 3,019,744 | 2/1962 | Carvel........................107/1 F |
| 3,285,779 | 11/1966 | Dunham.................134/175 X |
| 2,810,359 | 10/1957 | Stanford.....................107/1 F |

Primary Examiner—James R. Boler
Attorney—Zalkind, Horn & Shuster

[57] ABSTRACT

In a sandwich spreading machine, a downwardly open vessel for spreading substance is placed with its mouth above a closed casing having a waste receiving opening. In the slot between said mouth and said opening a track for advanced bread are placed. Waste from spreading substance and bread are collected in the casing, which is provided with inlet for liquid and outlet therefor and for the waste. The substance vessel is detachable from the casing for separate washing.

9 Claims, 3 Drawing Figures

WASHING MEANS FOR A SANDWICH SPREADING MACHINE

This invention relates to improvements in at a sandwich spreading machine of the type comprising means for spreading on a piece of bread a layer of a plastic substance such as butter, cheese, sausage etc.

A machine of the aforesaid type has to meet high hygienic requirements, include easy cleaning after its use, and use of foodstuffs that are fresh and proper.

These requirements can be realized by the spreading mechanism of the machine when mounted above a waste-receiving opening in the upper surface of an otherwise closed casing having an inlet for liquid, a sump and an outlet for the liquid and waste from bread and substance. Above said spreading mechanism being mounted a downwardly open vessel adapted to be detached from the casing and supplying the mechanism with the substance in question, which vessel possibly may be a standard-cartridge delivered by the substance supplier. The mouth area of said vessel corresponds to the shape of the bread piece advanced by feed means between the spreading mechanism and the waste-receiving opening.

Figure 1:
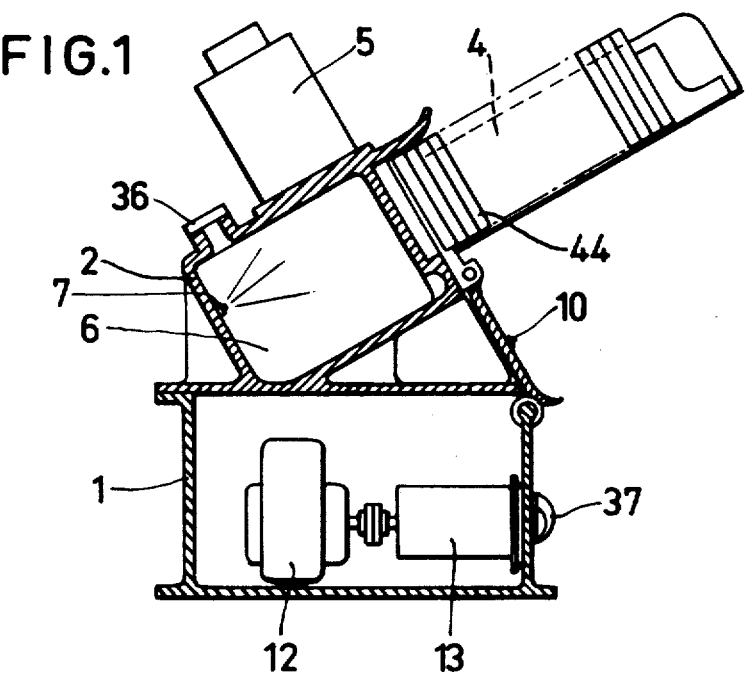
Figure 2:
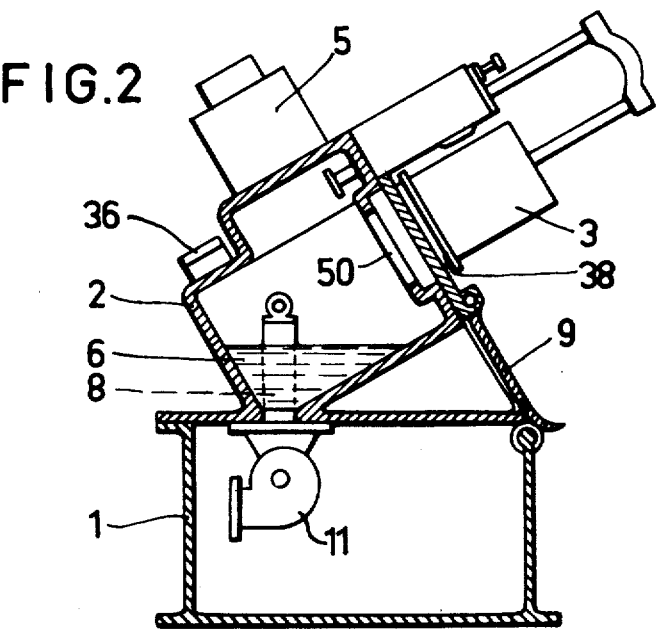
Figure 3:
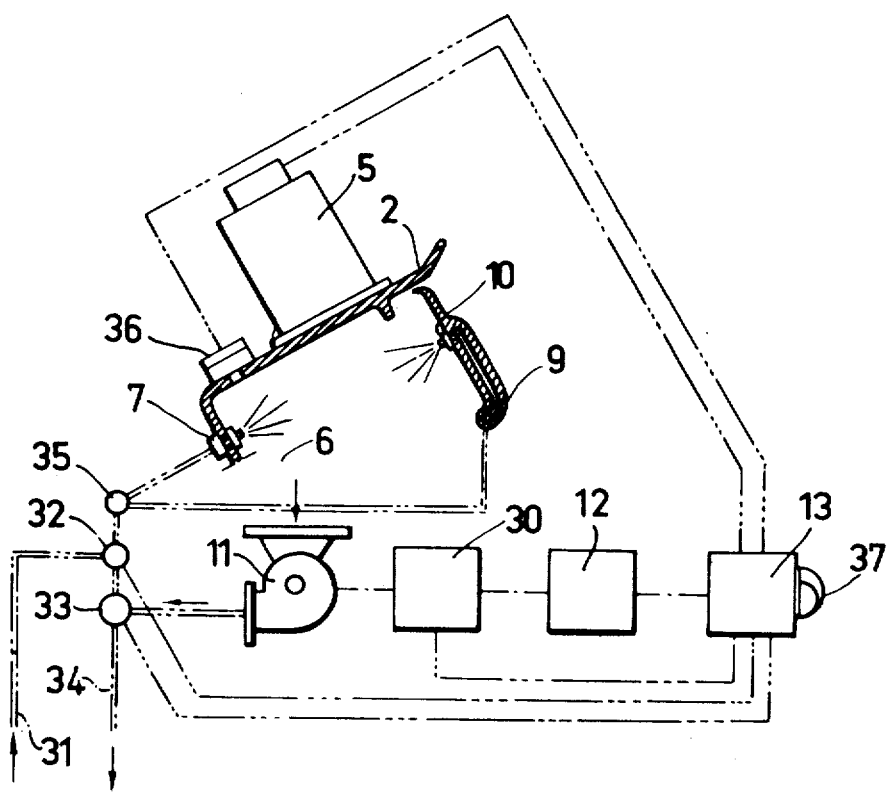

The invention is described in greater detail in the following, with reference to the accompanying drawings in which FIGS. 1 and 2 in a schematic way show a machine according to the principles of the The in a section along respective parallel planes, and FIG. 3 shows a block diagram for water and electric connections to the machine parts concerned. The machine shown in FIGS. 1 and 2 comprises a structure in the form of a foundation 1 with a casing 2 supported thereon. The casing in turn carries the two main parts of the machine, viz. a substance vessel 3 and connected thereto a cutting mechanism of any well known type to which as shown in FIG. 2 includes a cutting blade 38 above a waste-receiving opening 50 in said casing. FIG. 1 further shows a bread magazine 4 holding bread pieces 44 which are applied when the machine is utilized for spreading butter by the slicing of a thin layer of the butter so that it may be deposited on a piece of bread from the magazine in underlying relation to the cutter blade 38 as shown in FIG. 2. When the machine is utilized for applying slices of meat, this magazine, of course, can be replaced by an arrangement of some other kind. A motor 5 mounted on the casing drives the substance feed means, the cutting mechanism and, if provided, a bread conveying means. The details of the drives, feed means and cutting mechanism form no part of the present invention and are therefore omitted since such devices are well known to those skilled in the art and are not needed for an understanding of the invention as claimed. FIG. 1 shows a section through the machine directly in front of the bread magazine 4, and FIG. 2 shows a similar section adjacent the substance vessel 3.

The casing 2 is formed so as to include a sump 6 for collecting dishing water injected through one or several inlets 7 in the casing wall. The sump includes a strainer 8 and an outlet (not shown in detail). The bread magazine 4 as well as the substance vessel 3 are easily detachable from the casing. The vessel is filled with the substance desired (butter or margarine, cheese, cured meats and provisions etc.) on the place in question, or it is delivered from the producer as a hermetically sealed standard-type box, "cartridge" or insert for ensuring maximum hygiene. The filled (or partially emptied) substance vessel can, if required, be stored in a refrigerator or the like.

When the bread magazine and the substance vessel are removed for being cleaned separately, the exposed casing openings are closed by a cover 9 provided with a further inlet 10 for spraying dishing water on the operating parts of the machine.

The foundation 1 includes substantially a pump 11 for the circulation of dishing water and for draining, an electromotor 30 (FIG. 3) for operating the pump and via a gearbox 12 also a programming mechanism 13.

The bread magazine in its simplest construction is an oblong vessel for placing the bread therein. In the case of soft bread, i.e., bread other than crispbread, it is most simple to utilize bread pieces cut to the same size and made from the same material, for example rye or wheat, which are delivered directly from the bakeries. It is, of course, also possible as an alternative to equip the machine with a conventional means for cutting bread pieces from a homogenous loaf. It is further possible to use bread magazines intended for several different types of bread, which magazines may be interchangeable or be applied simultaneously so as to render possible a free choice between different types of bread. In this latter case, for example, a set of push-buttons or the like can be installed.

The bread magazine 4 and the substance vessel 3 may in principle be oriented vertically, horizontally or inclined.

An inclination angle of about 30° to the horizontal plane provides an attractive arrangement from a handling, controlling and functional point of view.

FIG. 3 shows by way of a block diagram an example of water and electric connections for the machine according to FIGS. 1 and 2.

Water is filled in from the fresh water line 31 to the sump 6 via the valve 32. The pump when in operation sucks water from the sump and presses the water to the valve 33, which by the programming mechanism can be adjusted so as either to wash with circulation of water through the inlets 7 and 10, or to drain through the outlet line 34. The valve 35 is a controlling valve for adjusting the water flow through the inlets 7 and 10. The programming mechanism 13 when set for washing, controls the electromotor 30, the valves 32 and 33 and a means 36 for filling in dishwashing detergent. For washing, the programming mechanism starts immediately with the main motor 5 so that the movable parts are subjected to an effective washing. The washing operation, of course, is blocked when the cover 9 is not closed and the substance vessel and, possibly, the bread magazine are attached to the machine. The programming mechanism is set by the handle 37 for starting, stopping or washing, etc.

Several modifications can be imagined within the scope of the invention. Particularly the cutting mechanism shown may be replaced by some other spreading mechanism operating by means of rolls, rotary knives or by extruding the substance through slots or the like.

What we claim is:

1. In combination with a machine having a magazine from which pieces of bread are advanced and a detachable cartridge from which layers of an edible substance are adapted to be deposited onto said pieces of bread through a downwardly opening mouth, the improvement residing in a casing enclosing a sump chamber, means mounting the machine on top of the casing and having an upper surface within which a waste-receiving opening is formed, said pieces of bread being advanced from the cartridge over the waste-receiving opening, nozzle means rendered operative following operation of the machine for injecting liquid into the casing to rinse waste products received through said opening, and outlet means connected to the casing for withdrawing the liquid and the waste products collected within the sump chamber of the casing.

2. The combination of claim 1 wherein the mouth of the cartridge corresponds to the shape of the pieces of bread.

3. The combination of claim 2 including cover means mounted on said upper surface for closing the opening while the liquid is being injected through the nozzle means.

4. The combination of claim 3 wherein said nozzle means includes a nozzle device mounted on the cover means.

5. The combination of claim 4 including a pump device connected to the outlet means for withdrawl of the waste products and recirculation of the liquid.

6. The cmobination of claim 1 including cover means mounted on said upper surface for closing the opening while the liquid is being injected through the nozzle means.

7. The combination of claim 6 wherein said nozzle means includes a nozzle device mounted on the cover means.

8. The combination of claim 6 including a pump device connected to the outlet means for withdrawal of the waste products and recirculation of the liquid.

9. The combination of claim 1 including a pump device connected to the outlet means for withdrawal of the waste products and recirculation of the liquid.

* * * * *